Jan. 14, 1936.　　　　R. H. PENNEBAKER　　　　2,027,876
OIL FILTER
Filed Dec. 6, 1934　　　　3 Sheets—Sheet 1
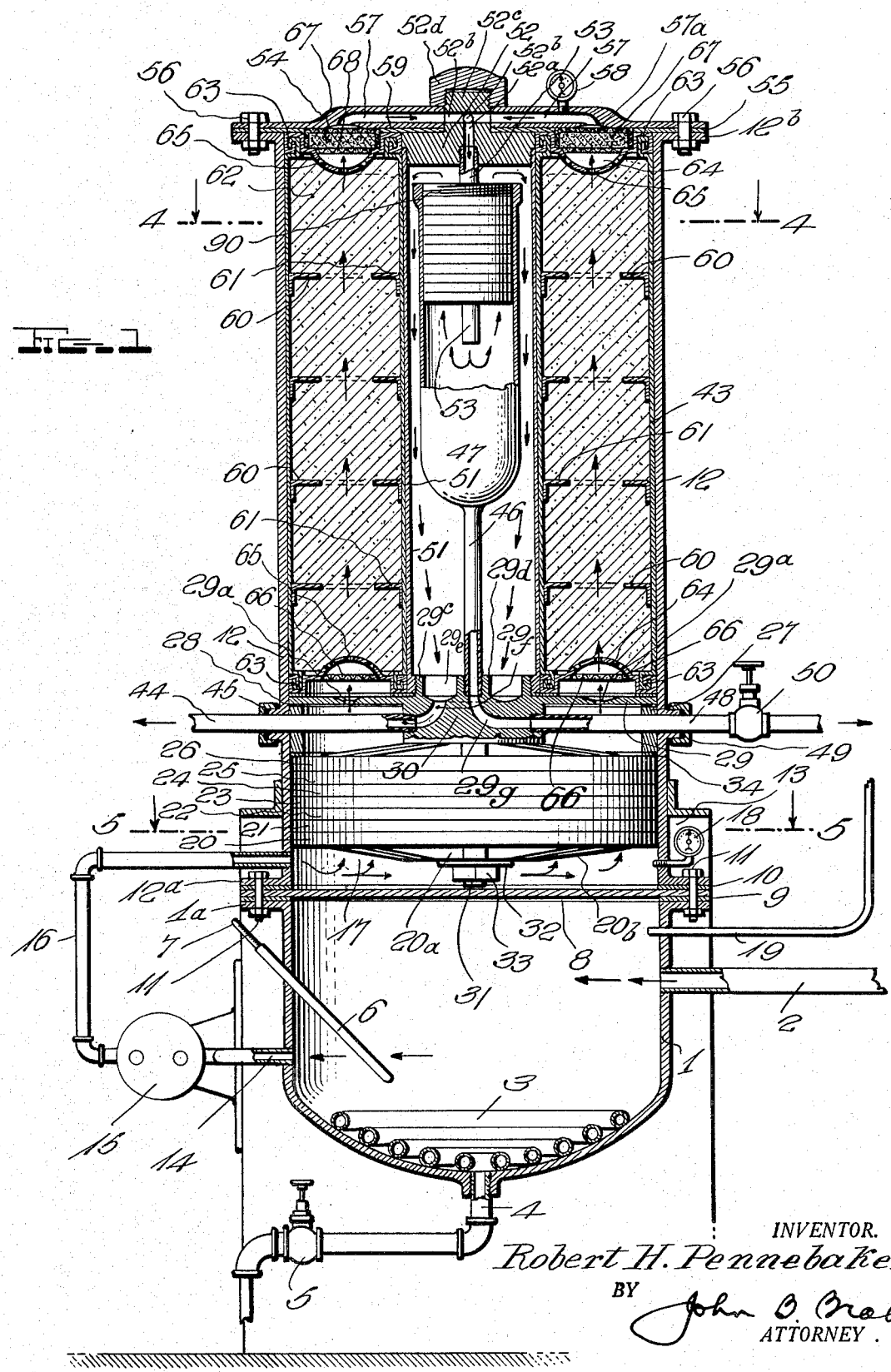
INVENTOR.
Robert H. Pennebaker,
BY John O. Brady
ATTORNEY.

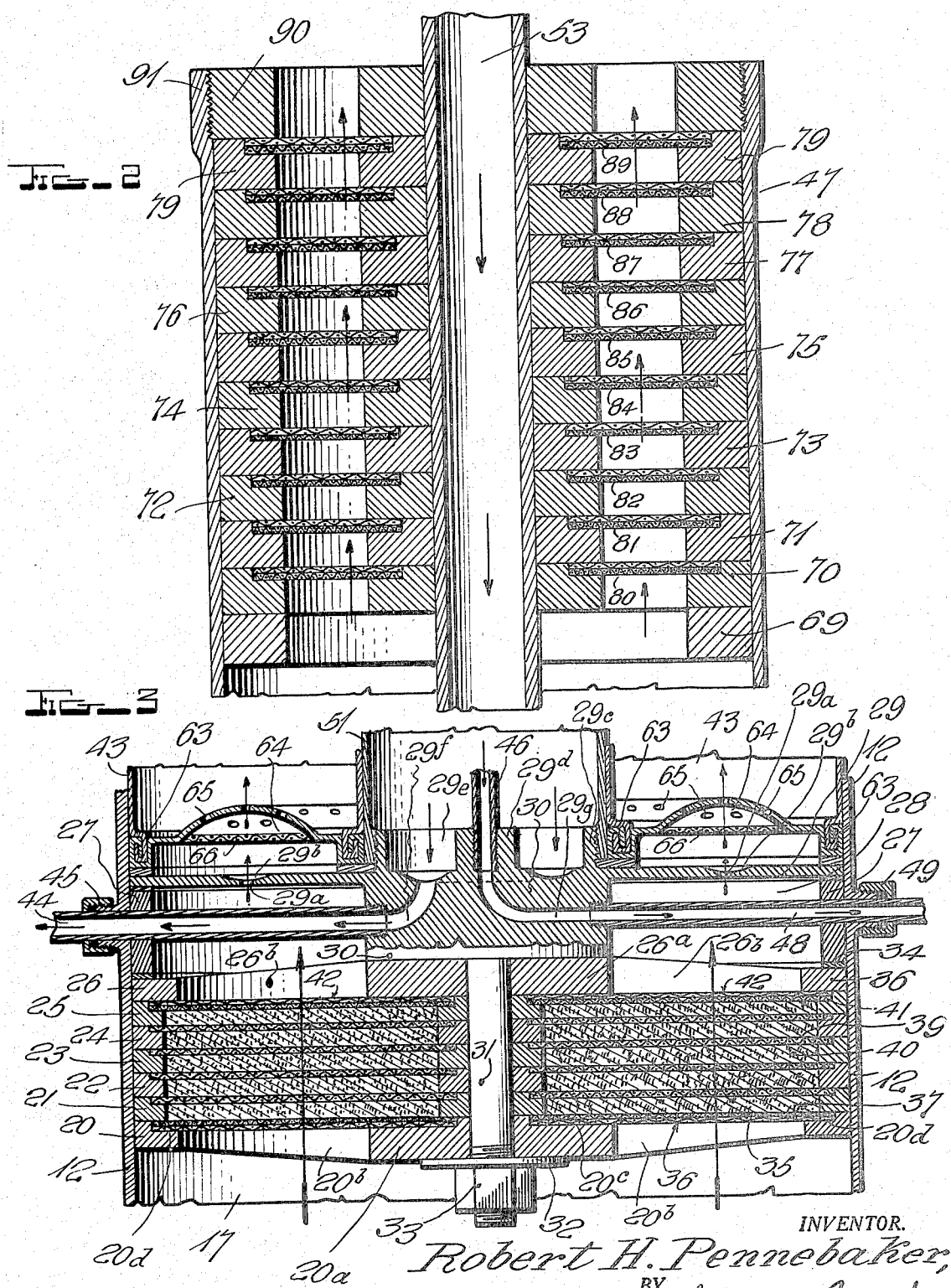

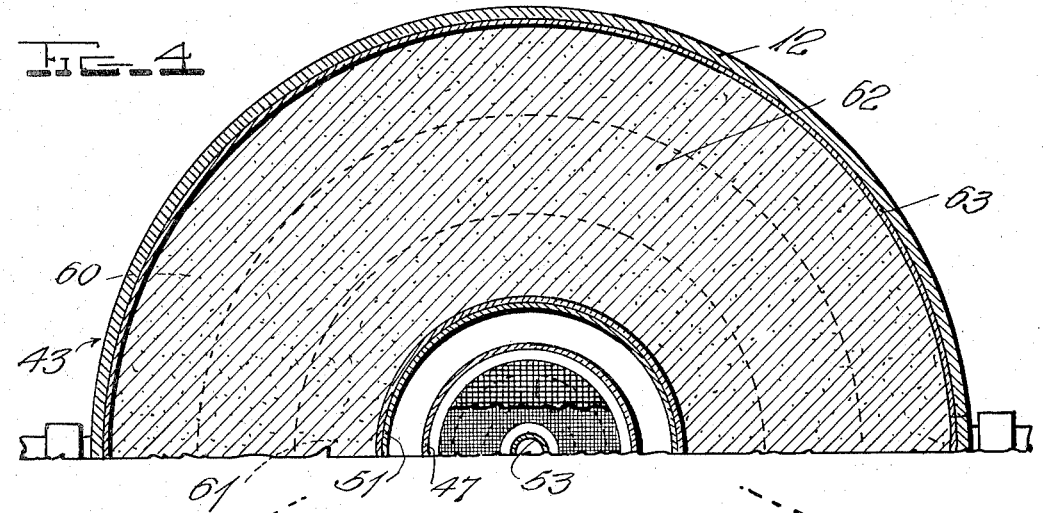
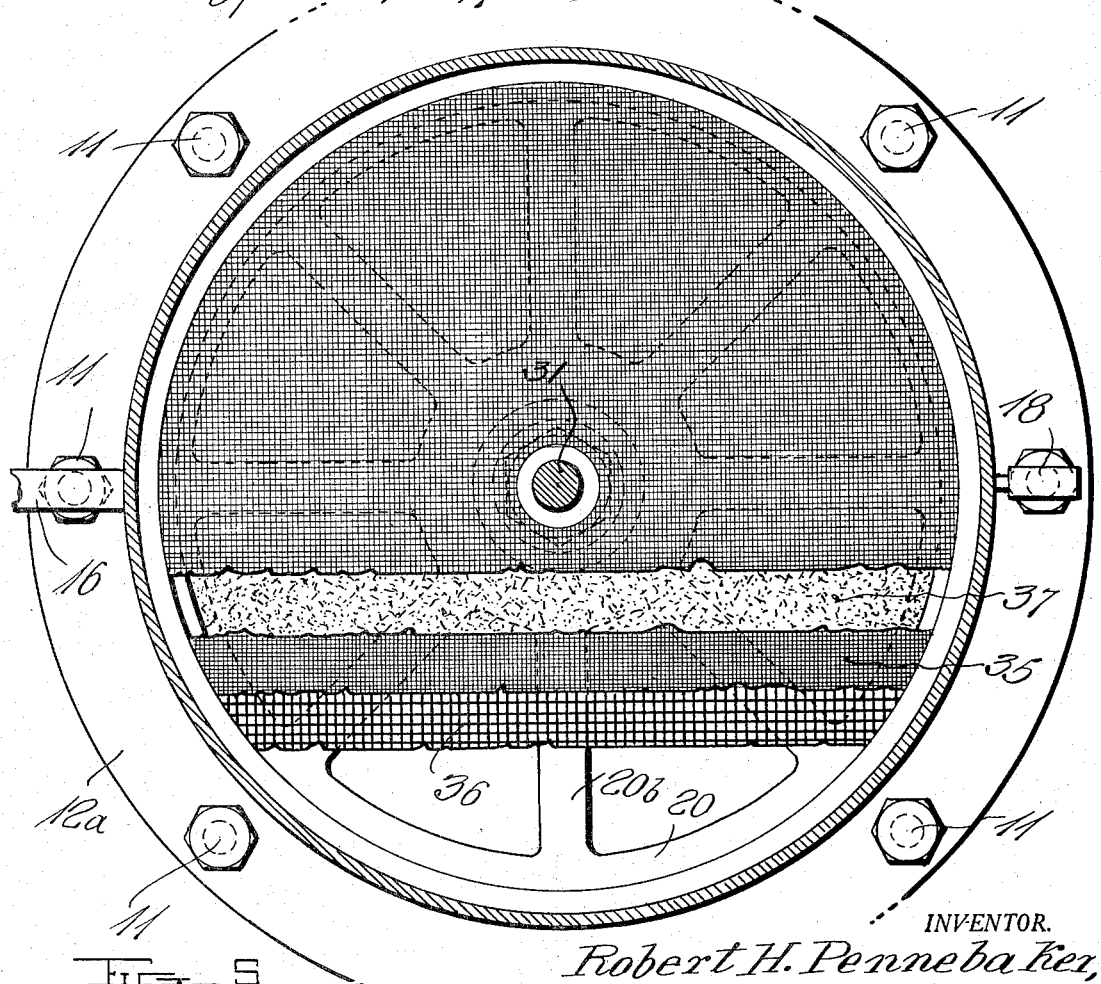

Patented Jan. 14, 1936

2,027,876

UNITED STATES PATENT OFFICE 2,027,876

OIL FILTER

Robert H. Pennebaker, Baton Rouge, La.

Application December 6, 1934, Serial No. 756,338

20 Claims. (Cl. 210—131)

My invention relates broadly to oil filters and more particularly to a construction of industrial type oil filter for enabling lubricant to be cleaned and re-used throughout the industrial arts.

One of the objects of my invention is to provide a simplified construction of oil filter in which used oil may be successively acted upon by different filter media to insure the removal of undesired particles of metal, grit, dirt, or other harmful sediment which may be collected by the lubricant.

Another object of my invention is to provide a construction of oil filter which comprises a multiplicity of chambers, certain of which include filtering devices through which used oil may be successively passed for freeing the oil of undesired particles and enabling the lubricant to be reused over long periods of time while maintaining its lubricating properties.

Still another object of my invention is to provide a construction of industrial type oil filter which includes means for collecting used oil and raising the temperature thereof and forcing the used oil at increased temperature through successive filtering media for removing from the oil particles of grit, metal, dirt, and other sediment injurious to the lubricating properties of the oil.

A further object of my invention is to provide a construction of oil filter which comprises an oil collecting reservoir and a multiplicity of oil filter chambers, each of which includes a plurality of separately removable filter elements for successively acting upon the used oil as the oil is forced therethrough for cleansing the oil, preparatory to re-use thereof.

A still further object of my invention is to provide a construction of oil filter which includes an oil collecting reservoir and a plurality of oil filtering chambers in which each chamber houses a multiplicity of individually removable filter elements which may be renewed from time to time to insure the efficient cleansing of used oil as the oil is passed through the individual filter elements under pressure.

Another object of my invention is to provide a construction of oil filter which includes an oil filter reservoir and a plurality of compartments associated therewith, one of which compartments houses a multiplicity of removable disc-like filter elements, another of which compartments houses a renewable cartridge-like filter element and still another of which includes a sediment trap and a series of fine mesh filter screens, all of which coact to insure the removal of solid matter harmful to the re-use of the lubricant.

Still another object of my invention resides in the construction of an oil filter which includes a multiplicity of filter elements constituted by mats of cellulose supported by screen-like members through which used oil is forced for eliminating from the oil harmful sediment which normally tends to detract from the lubricating properties of the oil.

A still further object of my invention is to provide a construction of oil filter which employs a multiplicity of screen-like filter elements which vary in mesh from a relatively coarse mesh to a relatively fine mesh progressively through the filter for insuring the gradual and successive screening of the used oil as the oil is forced through the filter system.

Other and further objects of my invention reside in the construction of industrial type filter, as set forth more fully in the specification hereinafter following by reference to the accompanying drawings, in which:

Figure 1 is a vertical cross-sectional view with certain of the parts illustrated in elevation; Fig. 2 is an enlarged cross-sectional view of the filter structure employed within the sediment trap; Fig. 3 is an enlarged cross-sectional view taken through the primary filter system; Fig. 4 is a lateral cross-sectional view taken through the secondary filter system on line 4—4 of Fig. 1, the view being broken away along a substantially diametrical line; and Fig. 5 is a cross-sectional view taken through the primary filter system on line 5—5 of Fig. 1.

My invention is directed to a simplified construction of industrial type oil filter comprising a relatively small number of parts which are inexpensive in construction and which includes filter elements which are readily renewable. The filter includes four principal compartments, that is, a used oil receiving compartment, a primary filtering chamber, a secondary filtering chamber, and a final filtering chamber. The used oil receiving compartment includes means for raising the temperature of the oil to approximately 300° to 350° F. The primary filtering chamber includes a multiplicity of disc-like filter members including screen-like members supporting cellulose filter mats through which the used oil is pumped from the used oil receiving compartment. The secondary filtering chamber is shaped to receive a cartridge-like and canister-shaped renewable filter unit which forms a housing for filtering clay, such as fuller's earth.

The renewable cartridge or canister containing the filtering clay is constructed in a manner similar to the construction set forth in my co-pending application Serial Number 680,497, filed July 14, 1933, entitled "Oil filter". The renewable filtering clay canister may be readily removed or inserted with respect to the secondary filtering chamber. The oil passes through the removable filtering clay canister and is directed through passages formed in a suitably ported head into an inner sediment trap and final filtering chamber. The inner sediment trap and the final filtering elements are a protective measure and provide means for screening any detrimental particles which may remain in the oil, and means for collecting sediment from the oil for periodic removal while allowing the oil clear of all sediments and detrimental particles to pass to an oil delivery line for enabling the oil to be reused. The arrangement of screen-like members in the final filtering and protective chamber is such that the size of the mesh of the screen-like members varies from a relatively coarse mesh at the point of entrance of the oil to a relatively finer mesh at the point of delivery of the oil, the size of the mesh of the intermediate screens varying gradually in accordance with the order in which the screens are placed. All of the screen-like members in the final filtering and protective chamber are individually and collectively removable so that the screen-like members may be readily renewed. The screen-like members including the cellulose filter mats in the primary filtering chamber are also readily renewable. The structure of the filter is such that all parts may be readily removed, the filter casing cleaned and the filter elements renewed and reinstalled in order that the filter may function over long periods of time with a high degree of efficiency.

Referring to the drawings in more detail, reference character 1 designates the receiver which is employed for collecting used oil. The receiver has an inverted dome-like bottom into which used oil is deposited either by gravity or under pressure through pipe 2. Ordinarily in lubricating systems for industrial machines the used oil is returned to the receiver 1 through pipe 2 by gravitation. There is a heating coil 3 disposed in the bottom of the receiver 1 by which the oil may be preheated with steam to a temperature higher than that of the boiling point of water, namely 212 degrees, to drive off all moisture contained in the oil. The temperature which this chamber 1 should be held at should be approximately 300° to 350° F. Of course this temperature can be maintained by steam coil as shown, or an electric unit or natural gas may be used, according to whichever is most economical for the type of plant in which the filter is installed. The oil inlet line 2 is near the top of chamber 1 with the vent 19 to the atmosphere located just above it as shown. The bottom of the chamber 1 is connected to a drain pipe 4 which connects through a suitable stop cock 5 to a suitable waste pipe by which sediment which may settle in the bottom of receiver 1 may be drained off, thus eliminating the passage of any considerable amount of sediment to the primary filtering chamber indicated at 17. The receiver 1 is provided with a thermometer well 6 which projects at an acute angle through one side of the receiver to a position below the normal oil level in the receiver. The thermometer well 6 receives the thermometer 7 which may be readily observed exteriorly of the filter casing to allow readings of the oil temperature to be checked from time to time. The receiver 1 is provided with an annular flange 1a at its upper extremity which coacts with a corresponding flange 12a on casing 12 of the housing for the primary and secondary filtering chambers. Gaskets 9 and 10 are disposed on opposite sides of the bulk head 8 which is disposed intermediate the annular flanges 1a and 12a and through which assembly the bolts 11 extend. A fluid tight joint is provided by reason of the clamping of bulk head 8 under pressure between gaskets 9 and 10 around the peripheral portion of the bulk head 8 which extends between the coacting flanges 1a and 12a.

The industrial filter apparatus is supported in any suitable manner and for purposes of illustration, I have shown a sheet metal support 13 for the casing which encircles the casing and maintains the casing in a vertical position. The suction line or outlet pipe from the oil receiver 1 is indicated at 14 in a position which is some distance up from the bottom of the casing 1. The outlet pipe 14 is elevated above the oil receiver 1 so that a minimum amount of sediment will be picked up as the oil is drawn from a position above any sediment which may settle to the bottom of the used oil receiver 1. A pump 15 is mounted in a position on the support 13. Pump 15 may be of the gear type receiving oil through the suction line 14 and delivering oil to the pipe 16 which connects to the lower portion of the primary filtering chamber 17. Inasmuch as a pressure is developed in primary filtering chamber 17, a pressure gauge 18 is connected with primary filtering chamber 17 in order to indicate the pressure which is built up therein. The primary filtering chamber is formed by a partition plate 29 which constitutes a closure for the top of the primary filtering chamber. The plate 29 is secured in position with respect to the interior walls of the casing 12 by means of a peripheral seat on gasket 28 supported by supporting ring 27 which is welded to the inside surface of casing 12. The plate 29 is a casting having a central portion 30 connected therewith with a depending stud 31 connected to the central casting 30. The stud 31 provides means for mounting a multiplicity of primary filter screens and mats. The filter screens and mats are mounted in circular frame members which are nested one with respect to the other on depending stud 31. The frame members have been indicated at 20, 21, 22, 23, 24, 25 and 26. The frame members 20 and 26 are shaped to form end securing means for the multiplicity of primary filtering units. That is to say, frame members 20 and 26 each include a central portion 20a and 26a, respectively, through which the depending stud 31 passes with spokes 20b and 26b interconnecting the respective central portions and the peripheral portions of the frame members 20 and 26, respectively. The frame member 20 is recessed peripherally of the central portion 20a thereof, as indicated at 20c, while the peripheral portion of frame member 20 is recessed, as indicated at 20d. The recesses 20c and 20d receive the coarse mesh, very stiff, screen 36 with the fine mesh, lighter weight screen 35 superimposed thereon. Immediately over the fine mesh screen 35, I mount a cellulose pulp mat indicated at 37. The filter elements supported by the other frame members are arranged in a manner similar to that already described. That is to say, each of the filter element frames 21, 22, 23, 24 and 25 include a central portion and a peripheral portion, and each frame member is recessed both adjacent its central portion and adjacent its peripheral portion. Screen members 39 are supported in the aligned peripheral recesses and serve as a confining surface against which the cellulose pulp filter mats 40 are compressed. The upper filter frame member 25 is provided with recesses which are of a depth corresponding to the recesses 20c and 20d in filter frame member 20, for in this upper filter frame 25, there is mounted not only the relatively fine screen member 41, but also the coarser screen member 42. The end frame member 26 bears directly against the annular gasket 34 located immediately beneath the supporting ring 27. Accordingly, when nut 33 is turned clockwise in engagement with screw threads on depending stud 31 and against washer 32 bearing against central portion 20a of frame 20, the entire series of primary filter frames is compressed and, by the same operation, plate 29 is compressed against gasket 28 resting on supporting ring 27 and gasket 34 is compressed between the upper peripheral face of filter frame member 26 and the lower surface of supporting ring 27, thereby insuring a compact filter assembly and a leak-proof peripheral junction between the primary and secondary filtering chambers. However, it is very simple to disassemble the primary filtering unit and clean the several filtering members or renew all filtering members which have become worn. The oil is forced through the cellulose pulp filter mats 37 and 40 and through the several coacting screen members 35, 36, 39, 41 and 42 for the purpose of removing a large part of foreign matter before the oil is delivered to a secondary filtering chamber. This removes the filter units in the secondary filtering chamber from unnecessary use and wear and prolongs the usefulness of the filtering clay, such as fuller's earth, in the canister or cartridge-like removable casing shown at 43 in the secondary filtering chamber. The oil, after being cleaned by passage through the screen-like members of cellulose pulp filter mats, is admitted to the secondary filtering chamber by passage through apertures 29a in partition plate 29. An annual oil groove 29b extends around the upper surface of plate 29 and is apertured at intervals, as indicated at 29a. The partition plate 29 has the central portion 30 thereof shaped in a very special manner. There is an upwardly projecting peripheral externally screw-threaded portion 29c and a centrally upwardly projecting portion 29d which is internally screw-threaded. An annular oil groove 29e is provided in the central portion of plate 29, as shown, which serves as a receiver for the clean oil which is delivered through oil outlet port 29f to the oil delivery line 44. The oil delivery line 44 passes through aligned apertures in supporting ring 27 and the wall of casing 12 and through the packing nut and packing means indicated generally at 45. The upwardly extending central portion 29d is internally screw-threaded for receiving the end of pipe 46 leading from the inner sediment trap and final filtering chamber 47. The pipe 46, when screwed into the upwardly extending central portion 29d, forms a continuation of port 29g which connects with the blowout or flush pipe 48 which, in turn, extends through aligned apertures in supporting ring 27 and the wall of the casing 12 and through the packing nut and packing indicated generally at 49. A valve 50 is provided for emitting steam or fluid to the inner sediment trap and protective chamber 27 for flushing the chamber of accumulated deposits as may be necessary from time to time.

The secondary filtering chamber is provided with a cylindrical member 51 which is internally screw-threaded on opposite ends thereof with one of the screw-threaded ends engaging the upwardly projecting screw-threaded peripheral portion 29c of plate 29. The upper end of cylindrical member 51 is internally screw-threaded to receive the closure member 52 which also provides a support 4 and an oil connection 2, the inner sediment trap, and final filtering chamber 47. The manner of supporting the inner sediment trap and final filtering chamber 47 is very simple in that a central pipe member 53 is screw-threaded into the closure 52 and provides a continuation of the oil passage formed by the port 52a in closure 52. The closure 52 also has a multiplicity of laterally extending ports or oil passages 52b therein extending normal to the oil passage 52a and which are adapted to be aligned with the oil passages 57 formed in the head 54 on the filter casing 12. The filter casing 12 has an upper annular flange 12b connected therewith and forms a seat for the annular gasket 55 and the peripheral portion of head 54 which is secured in position by means of bolt members 56. The head 54 is centrally apertured to receive the upwardly projecting stud portion 52c of closure 52. The head 54 is secured in position with respect to the stud portion 52c by means of cap nut 52d. In order to insure against leakage of oil from the registered passages 57 and 52d, I provide a gasket 59 between the lower surface of the head 54 and the upper surface of the closure member 52. The laterally extending ports 52b in closure 52 connect with oil passage 52a leading to the pipe 53 which extends to the inner sediment trap and final filtering chamber 47, and also registers with the oil passages 57 which are formed in head 54. In order to check the pressure of the oil in the course of the passage thereof through the head 54, I provide an oil pressure gauge 58 mounted on the head 54 in the manner shown. An oil groove 57a is disposed below the head 54 in an annular path for insuring the delivery of oil through some one of the several radial passages 57 to the oil passages 52b in closure 52. In order to further insure the disposition of the oil rapidly from the radially extending passages 57 to the oil passages 52b, I provide a groove extending entirely around the stud 52c in alignment with the passages 52b in stud 52c and in alignment with passages 57 in the head 54.

The cylindrical casing 51 is mounted concentrically with respect to the interior wall of the enclosing casing 12 providing an annular chamber in which the canister or cartridge 43 may be removably mounted. The removable cartridge or canister which contains the filtering clay, such as fuller's earth, is symmetrically formed from any desired materials such as sheet metal having a multiplicity of baffle members 60 and 61 mounted on the interior walls of the canister or cartridge and filled intermediate the baffle members and adjacent the baffle members at opposite ends of the cartridge or canister with fuller's earth or filtering clay, as represented generally at 62. The ends of the canister or cartridge are rolled into tight connection with the material constituting the walls of the canister or cartridge, as represented generally at 63. Any suitably formed joint may be employed. The opposite ends of the canister or cartridge are preformed inwardly, as represented at 64. The ends are perforated for the passage of oil, as represented at 65. Screen-like members are provided across each of the perforated portions of the preformed ends of the canister or cartridge, as shown at 36. In order to insure the further filtering of the oil as it leaves the cartridge or canister, I provide a cellulose pulp filter member 67 arranged about the upper head of the filter canister or cartridge and retained in position by means of a screen-like retaining frame 68. That is to say, the cellulose pulp-like member 67 is prevented from losing its shape by the compressive force imparted by the wire frame-like member 68. The wire frame like member 68 prevents collapse of the mat 67 and avoids breaking up of the mat 67 into particles which might tend to go over into the inner sediment trap 47 and which receives the oil from the filtering clay compartment or cartridge. This filtering mat 67 is placed on top of the clay compartment to prevent the possibility of fine particles of clay going over into the inner sediment trap and final filtering chamber 47.

The inner sediment trap and final filtering chamber is made of light strong material formed into a cylindrical shaped vessel and connected with the drain pipe 46 which is welded into the inverted convex bottom of the cylindrical portion of the trap 47.

The inner sediment trap and final filtering chamber is substantially supported concentrically within the cylindrical member 51 in spacial relation to the interior walls of cylindrical member 51. The pipe 53 which depends downwardly from the closure 52 terminates substantially above the bottom of the sediment trap 47 and delivers oil which has passed through primary filter screens and cellulose pulp mats, and through the filtering clay unit and the cellulose pulp mat associated therewith. The inner sediment trap and final filtering chamber 47 has a retainer ring 69 welded to the interior wall of the chamber 47 in a position substantially less than one-half the depth of the chamber. The ring 69 welded to the interior wall of the chamber 47 provides a stop against which a series of retainer rings for protective screens are mounted, as indicated at 70, 71, 72, 73, 74, 75, 76, 77, 78, and 79. Each retaining ring has a central portion apertured for the passage of tube 53. The central portion of each retaining ring is connected with the peripheral portion thereof by means of arms which provide apertures therebetween for the circulation of oil in an upward direction through the aligned apertures in the several retaining rings. Each of the retaining rings is recessed adjacent both the central portion and the peripheral portion thereof, for receiving a screening member. The screening members vary in size from a relatively coarse mesh supported by retaining ring 70 to a relatively fine mesh supported by retaining ring 79, with the intermediate sizes disposed in graduated order therebetween. That is to say, screen members 80 include in combination a stiffening screen and a filtering screen with the filtering screen 80 having approximately 100 mesh. The filtering screens 81, 82, 83, 84, 85, 86, 87, 88, and 89 vary in size from the 100 mesh screen 80 to an approximately 260 mesh screen 89. The variation in size is gradual and in each instance the filtering screen is supported by a relatively coarse screen which serves to stiffen and maintain the filtering screen in position. The retaining rings are held in position by means of a top retaining ring indicated at 90 which is screw threaded to engage interior screw threads 91 formed in the upper extremity of the interior wall of the sediment trap 47. The top retaining ring 90 has a central portion similar to the central portion of each of the aforesaid retaining rings through which the tube 53 passes. Apertures are provided in the top retaining ring 90 in alignment with the apertures in the other retaining rings for the passage of oil upwardly through the several filter screens. The down pipe 53 delivers filter oil to the sediment trap. The oil must change its direction and flow upwardly through the several filter screens and overflow across the top of the top retaining ring 90 and drop downwardly through the space between sediment trap 47 and the interior wall of cylindrical member 51 to the annular trough 29a and through the passage 29f to the oil delivery pipe 44.

In the primary filtering chamber 17 I provide screens which are of relatively fine mesh such as 80 mesh and at both the top and bottom of the filter unit I reinforce the fine mesh screen with a heavier mesh screen. In the final filtering chamber I reinforce all of the screens with heavier screens. This reinforcement is provided to insure the protection of the several screens against rupture under the pressure of the forceful feeding of the oil through the filter. The cellulose pulp mats are completely protected wherever they are used in the filter of my invention by surrounding the cellulose filter mats with screen-like material, which prevents the breaking up of the cellulose pulp mats and the distribution of such cellulose matter through the filter. The several filter elements employed in the filter system of my invention coact to completely filter the oil. That is to say, the construction of the dome-like oil receiver 1 is such that a large part of the sediment in the oil gravitationally separates from the used oil. The primary filtering chamber contains elements through which the oil is forcefully passed and which initially remove quantities of foreign matter therefrom. Subsequently the oil is forced through the filter clay unit and because of the arrangements of baffles is forced to take a path through the filtering clay, and is prevented from seeping along the interior walls of the canister or cartridge. Next, the oil is further filtered by passage through the screen and cellulose pulp mat enclosed thereby at the top of the filter casing. Finally the oil is subjected to a progressive filtering action by passage through a multiplicity of filtering screens within the final filtering chamber. Any foreign matter remaining in the oil prior to the final filtering stage may settle at the bottom of the trap 47 and be periodically removed therefrom. The clear oil overflows at the top of the final filtering chamber and is delivered to the oil discharge pipe line 44 fully filtered and ready for reuse.

The filter construction of my invention may be readily disassembled by removal of the head 54, gaskets 55 and 59, and removal of the cellulose pulp mat 67 encased in screen-like member 68. The canister or cartridge-like member 43 may then be readily removed. The receiver 1 may be removed by withdrawing bolts 11, thereby opening bulk head 8 and allowing access to be had to securing nut 33. Upon removal of securing nut 33 all of the filter screens and cellulose pulp mats constituting the primary filter system may be removed, washed or renewed.

The filtering elements in the final filtering chamber may be readily removed by opening closure 52 and withdrawing pipe 53. Thereafter the top retaining ring 90 is unscrewed to disengage the top retaining ring 90 from the interior of the chamber 47, whereupon all of the retaining rings and protective filter screens may be removed to be washed or renewed. I have found the filter construction of my invention to be highly practical, and while I have described the preferred embodiments of my invention I realize that changes and modifications may be made—such modifications are fully contemplated—and I accordingly desire that it be understood that no limitations upon my invention are intended other than are opposed by the scope of the appended claims.

What I claim as new and desire to secure by Letters Patent of the United States is as follows:

1. An oil filter comprising a used oil receiving reservoir, a primary filtering chamber, a secondary filtering chamber of annular shape, and a final filtering chamber concentrically disposed with respect to said secondary filtering chamber; means for delivering used oil to said used oil receiving reservoir, means for pumping the used oil through said primary, secondary and final filtering chambers, and means for delivering filtered oil from the outlet of said final filtering chamber.

2. An oil filter comprising a receptacle for receiving used oil, primary and secondary filtering chambers mounted adjacent said receptacle, means for forcibly circulating oil from said used oil receptacle through said primary and secondary filtering chambers, an outlet for filtered oil connected with said secondary filtering chamber, said secondary filtering chamber being annular in shape, a sediment trap concentrically disposed with respect to said secondary filtering chamber and receiving oil from the outlet of said secondary filtering chamber, and means for flushing said sediment trap.

3. An oil filter comprising an enclosing casing including a used oil collecting receptacle, primary and secondary filtering chambers disposed in superimposed relation with respect to said receptacle, means for forcing used oil through said primary and secondary filtering chambers in progression, said secondary filtering chamber being annular in shape, a sediment trap concentrically disposed with respect to said secondary filtering chamber, passages for filtered oil connecting said sediment trap with said secondary filtering chamber, and means for flushing said sediment trap.

4. An oil filter comprising a casing including a used oil collecting receptacle and primary and secondary filter chambers disposed in superimposed relation with respect thereto, composite filtering media in each of said primary and secondary filter chambers including cellulose pulp mats and filter screens, said secondary filter chamber being annular in shape, a final filter chamber concentrically disposed with respect to said annular shaped chamber, a plurality of filtering screens mounted in said final filter chamber, an outlet for filtered oil connected with said final filter chamber, and means for forcibly circulating used oil from said receptacle through said primary, secondary and final filter chambers for delivering filtered oil at said outlet.

5. An oil filter comprising a receptacle for receiving used oil, a primary filtering chamber and an annular shaped secondary filtering chamber disposed in the order named in superimposed relation with respect to said receptacle, composite filtering media disposed in each of said filtering chambers, a final filtering chamber disposed centrally of said annular shaped chamber, a plurality of filtering screens mounted in said final filtering chamber, an outlet for filtered oil connected with said final filtering chamber, a sediment trap in said final filtering chamber, and means for forcibly circulating oil from said receptacle through said primary and secondary filtering chambers and into said sediment trap, thence through said final filtering chamber to said filtered oil outlet.

6. An oil filter comprising a receptacle for receiving used oil, a primary filtering chamber and an annular shaped secondary filtering chamber disposed in the order named in superimposed relation with respect to said receptacle, composite filtering media disposed in each of said filtering chambers, a final filtering chamber concentrically disposed with respect to said annular shaped chamber, a plurality of filtering screens mounted in said final filtering chamber, an outlet for filtered oil connected with said final filtering chamber, a sediment trap in said final filtering chamber, means for forcibly circulating oil from said receptacle through said primary and secondary filtering chambers and into said sediment trap, thence through said final filtering chamber to said filtered oil outlet, and means for flushing said sediment trap for removing accumulated matter which may settle from the partly filtered oil.

7. An oil filter comprising a casing including a receptacle for collecting used oil, primary and secondary filtering chambers disposed in superimposed relation with respect thereto, said secondary filtering chamber being annular in shape, composite filter elements in each of said chambers, the filter elements in said primary filtering chamber comprising a multiplicity of parallel disposed filter screens and cellulose pulp mats and the filter elements in said annular shaped secondary filtering chamber including an annular shaped removable cartridge enclosing filtering clay and a composite screen-like and cellulose pulp mat filter unit disposed at the outlet of said cartridge filter element, a final filtering chamber disposed centrally of said annular shaped secondary filtering chamber, a plurality of filtering screens mounted in said final filtering chamber, an outlet for filtered oil connected with said final filtering chamber, and means for forcibly circulating used oil from said receptacle through the filter elements in said primary, secondary, and final filtering chambers for delivering filtered oil at said outlet.

8. In an oil filter, a filter unit comprising a multiplicity of superimposed filter elements, each of said filter elements including a screen-like member and a cellulose pulp mat, supporting means for said superimposed filter elements comprising a pair of perforate end members having a relatively fine mesh retaining screen and a relatively coarse mesh supporting screen mounted thereon, and means for forcibly passing oil containing foreign matter therein in paths normal to the planes of said screen-like members and said cellulose pulp mats.

9. In an oil filter, a filter unit assembly comprising a central support, an axially depending stud connected with said support, a multiplicity of frame members disposed in superimposed relation and supported by said stud, the top and the bottom frame members being of reinforced perforate construction and carrying a relatively fine mesh retaining screen and a relatively coarse mesh supporting screen, the intermediate frame members supporting a screen-like filter element and a cellulose pulp mat thereon, screw means on said stud for compressing said pulp mats between said top and bottom frame members, and means for forcibly passing oil having foreign matter therein through said screen-like elements and said cellulose pulp mats in a direction normal to the planes thereof.

10. In an oil filter, a casing, a partition member supported laterally of said casing for dividing said casing into two sections, the lower of said sections providing a primary filtering chamber, the upper of said sections including secondary and final filtering chambers, means projecting upwardly from said partition member for supporting filter elements in said final filtering chamber, means depending downwardly from said partition member for supporting filter elements in said primary filtering chamber, filter elements in said secondary filtering chamber being supported on said partition member concentrically of said upwardly projecting supporting means and the filter elements in said final filtering chamber, and means for forcibly circulating oil having foreign matter therein through the filter elements in each of said chambers.

11. An oil filter including a casing, a support, a member extending laterally of said casing, a stud depending axially from said member, a multiplicity of frame members carried by said stud, each of said frame members having annular recesses formed therein, screen-like members mounted in said annular recesses, the frame members constituting the limits of said filter assembly having two screen-like members disposed in superimposed relation, and cellulose pulp mats supported by said screen-like members in selected ones of said frame members, and means for directing oil having foreign matter therein through said screen-like members and said cellulose pulp mats in a direction normal to the planes thereof.

12. In an oil filter, a filtering chamber including an interiorly disposed casing portion, and an exteriorly disposed casing portion spaced with respect thereto for receiving a filter canister therebetween, a cellulose filter mat seated across the top of said filter canister, a head for said external casing, said head having oil passages therein extending to a position centrally thereof from positions adjacent said cellulose filter mat, a closure member for said interiorly disposed casing portion, a pipe member depending downwardly from said closure member and connected with the oil ports in said head, and a sediment trap carried by said pipe member for accumulating foreign matter remaining in said oil after it passes through the aforesaid filter elements.

13. A sediment trap and filter stage for oil filters comprising a casing, a flush pipe connected with said casing, an oil inlet pipe depending centrally within said casing, a supporting ring member fixed to the wall of said casing above the extremity of said depending pipe, a multiplicity of frame members supported on said ring member, extending laterally of said casing and disposed concentrically with respect to said pipe, screen-like filter elements supported by each of said frame members, and a retaining member screw-threaded into said casing and maintaining said frame members in position against said supporting ring member, said frame members and said retaining member having aligned apertures therein for the passage of oil from said pipe through said screen-like elements.

14. A sediment trap and filter stage for oil filters comprising a casing, a flush pipe connected with said casing, an oil inlet pipe depending centrally within said casing, a supporting ring member fixed to the wall of said casing above the extremity of said depending pipe, a multiplicity of frame members supported on said ring member, extending laterally of said casing and disposed concentrically with respect to said pipe, screen-like filter elements supported by each of said frame members, and a retaining member screw-threaded into said casing and maintaining said frame members in position against said supporting ring member, said frame members, and said retaining member having aligned apertures therein for the passage of oil from said pipe through said screen-like filter elements in a direction normal to the plane of said screen-like filter elements, said screen-like filter elements being graduated in size from a relatively fine mesh adjacent one end of the filter unit assembly to a relatively coarse mesh at the other end of the filter unit assembly.

15. A sediment trap and filter stage for oil filters comprising a casing, a flush pipe connected with said casing, an oil inlet pipe depending centrally within said casing, a multiplicity of frame members extending laterally of said casing and disposed concentrically with respect to said oil inlet pipe, and a pair of screen-like elements supported by each of said frame members, said frame members having aligned apertures therein for the passage of oil from said inlet pipe through said screen-like elements, each pair of said screen-like elements comprising a stiffening means and a filtering means.

16. In an oil filter, a filter unit assembly comprising a multiplicity of parallel disposed frame-like members including end frame-like members and intermediate frame-like members, said end frame-like members supporting a pair of screen-like elements, one of said elements constituting a stiffening means and the other of said elements constituting a filtering means, said intermediate frame-like members each supporting a screen-like element constituting a filtering means, and layers of cellulose pulp compressed between the screen-like elements in said intermediate frame-like members.

17. In an oil filter, as described in claim 6, means in said used oil receiving receptacle for raising the temperature of the used oil before the used oil is delivered to the filtering chambers.

18. An oil filter comprising a casing, a used oil collecting receptacle at the base of said casing, a plurality of filter stages and a sediment trap in said casing, said sediment trap and one of said filter stages disposed in concentric relation with another of said filter stages, means for forcibly delivering oil from the used oil collecting receptacle upwardly through each of said filter stages in succession, and means in said used oil collecting receptacle for elevating the temperature of the used oil before the used oil is delivered to the filter section.

19. An oil filter, comprising a casing, a used oil collecting receptacle, at the base of said casing filter sections in said casing superimposed upon said oil collecting receptacle, a pair of said filter sections being disposed in concentric relation, means interconnecting said used oil collecting receptacle and said filter sections for forcibly transferring oil from said used oil collecting receptacle through said filter sections, and means in said used oil collecting receptacle for driving off moisture from said used oil before the used oil is forcibly delivered to said filter sections.

20. In an oil filter, a cylindrical casing, means for demountably supporting a plurality of filter elements in said casing and providing a fluid tight joint at the line of support thereof, comprising a ring member fixed to the wall of said casing, a transversely extending circular plate member supported on the upper edge of said ring member and having a stud depending centrally therefrom, an apertured circular supporting member mounted on said stud and having a peripheral face thereof adapted to engage the lower edge of said ring member, a plurality of annular shaped filter elements supported on said stud adjacent said supporting member and a second apertured supporting member mounted on said stud adjacent said filter elements, sealing gaskets disposed on said upper and lower edges of said ring member, and screw means on the lower end of said depending stud adapted to bear on said second supporting member and operative to compress said filter elements between said supporting members and clamp said sealing gaskets between opposite edges of said ring member and said circular plate member and said first mentioned supporting member, respectively.

ROBERT H. PENNEBAKER.